Feb. 28, 1939. R. B. EVERSON 2,148,902
GAS ABSORBING SYSTEM
Filed Nov. 20, 1935
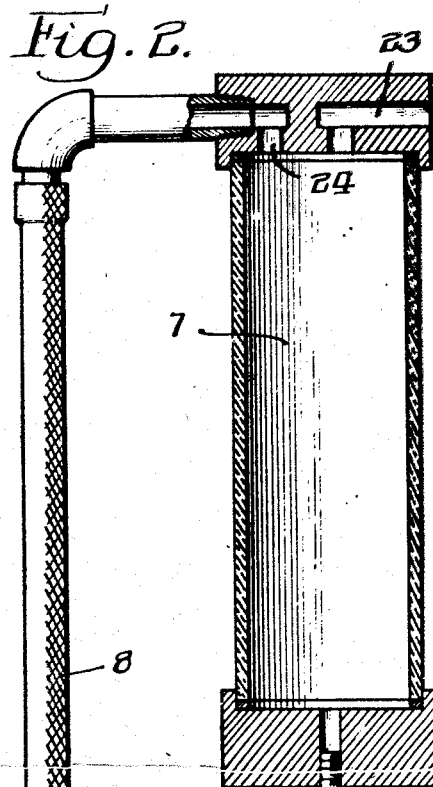
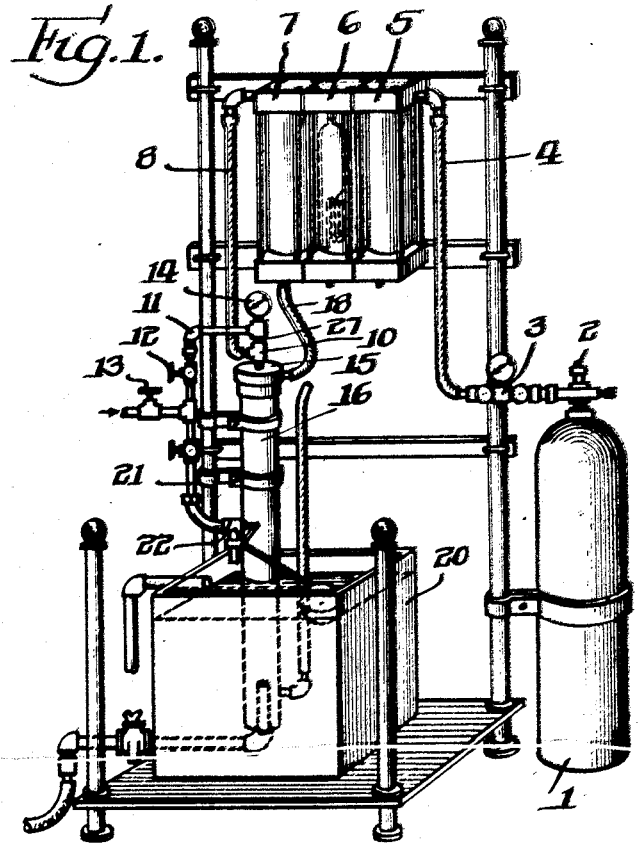
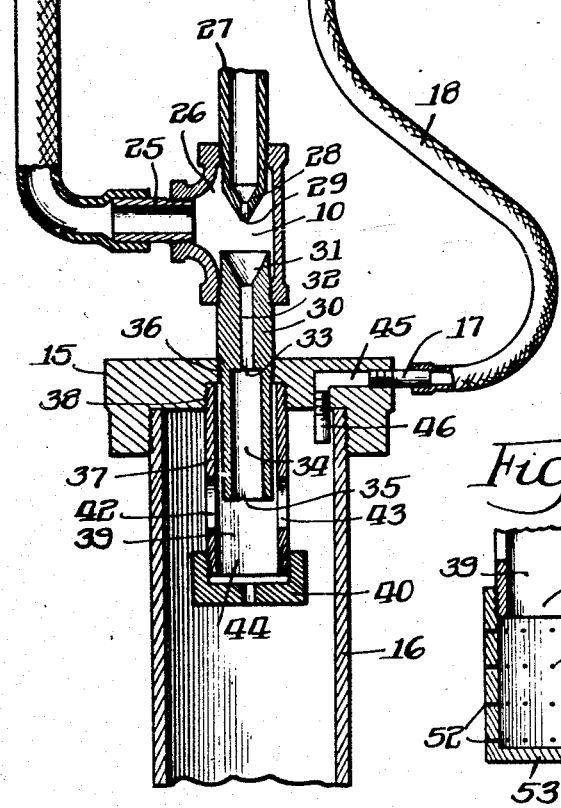
INVENTOR.
Roy Blair Everson
BY Cox & Moore
ATTORNEYS.

Patented Feb. 28, 1939

2,148,902

UNITED STATES PATENT OFFICE 2,148,902

GAS ABSORBING SYSTEM

Roy Blair Everson, Chicago, Ill.

Application November 20, 1935, Serial No. 50,803

9 Claims. (Cl. 261—19)

This invention relates in general to a gas absorbing system and, more particularly, to a system in which gas absorption may take place without incurring danger from the discharge of an unabsorbed over-supply of the gas.

It is an object of this invention to provide an absorbing system for absorbable gases in which gases may be more efficiently and economically absorbed.

It is another object of this invention to provide an absorbing system for absorbed gases in which there is substantially no waste of the absorbable gas.

It is another object of this invention to provide an absorbing system for absorbable gases in which the danger arising from an unabsorbed over-supply of gas is eliminated.

It is another object of this invention to provide an absorbing system for absorbable gases in which the gas cannot be injected into the absorption chamber before a sufficient supply of the absorption medium is present in the chamber.

It is another object of this invention to provide a type of vacuum injector mechanism which will cause injection only when the rate of flow of the absorption medium through the injector mechanism has increased beyond a predetermined minimum.

It is another object of this invention to provide an absorption system for gases which is protected against unauthorized regurgitation of the absorbing medium into the gas supplying mechanism.

Numerous other objects and advantages will more fully appear during the course and progress of the following specification.

Figure 1 is a perspective view of an entire gas absorbing mechanism showing a preferred embodiment of the present invention in relationship to the entire equipment.

Figure 2 is a cross-sectional view of a preferred embodiment of the present invention.

Figure 3 is a perspective view of the injector head of the embodiment of the invention shown in Figure 2.

Figure 4 is a cross-section view of a variation of the auxiliary chamber forming structure shown at 40 in Figure 2.

The preferred embodiment of the present invention associated with a preferred form of the entire gas absorbing system, as shown in Figure 1, comprises a gas storage tank 1, a supply valve 2 and a pressure reducing mechanism 3. Conduit means 4 connect the pressure reducing mechanism 3 with a primary supply chamber 5. The primary supply chamber is in turn associated with a gas metering chamber 6. The gas metering chamber 6 is in turn operatively associated with an auxiliary supply chamber 7. A conduit means 8 connects the auxiliary supply chamber 7 to the injector mechanism 10. The injector mechanism 10 is connected to a supply of water pressure through the water supply line 11 and thence through the valves 12 and 13 respectively to the water-main. A water pressure meter 14 is installed in the water supply line 11. The injector 10 is also connected to the absorption tower cap 15. The absorption tower cap 15 is threadedly connected to the absorption tower 16. A by-pass nipple 17 passes through the absorption tower cap 15 and is connected to one end of the by-pass conduit 18. The by-pass conduit 18 opens at its other end into the auxiliary supply, or balance chamber 7. The absorption tower 16 extends downwardly into a solution tank 20. The solution tank is supplied with water through the water supply line 21 and the float valve mechanism 22. The construction of the absorption tower and solution tank together with the various means associated therewith for producing a solution of given concentration with respect to the amount of absorbed gas therein forms the subject matter of co-pending application Serial No. 747,817, to Roy Blair Everson, filed on October 11, 1934.

A preferred embodiment of the injector system, which forms the subject matter of the present invention, is shown in cross-section in Figure 2 and comprises the auxiliary supply chamber 7, the conduit means 8, the injection mechanism 10, the absorption tower cap 15 and the by-pass conduit 18. The auxiliary supply chamber is connected to the metering means at its top through the passage 23 and is connected to the conduit means 8 through the passage 24. The conduit means 8 is connected to the injector 10 through a nipple 25. The injector comprises a preferably T-shaped chamber 26. An injector nozzle 27 is threaded through the top of the chamber 26 and extends downwardly therein. This nozzle is formed with a pointed tip 28 in the end of which is an outlet 29 of considerably smaller diameter than the diameter of the upper portion of the nozzle. A throat member 30 is threaded into the bottom portion of the T-shaped chamber 26 and extends upwardly therein in juxtaposition to the nozzle member 27. The throat member has a downwardly disposed V-shaped opening 31 which is shaped complementarily to the shape of the pointed portion 28 on the nozzle 27, the downwardly disposed V-shaped opening 31 being comparatively wide at the top, tapering downwardly and opening into the throat passage 32. The throat passage 32 is of somewhat larger diameter than the opening 29 in the tip of the nozzle but still of considerably smaller diameter than the diameter of the upper portion of the nozzle 27. This throat passage 32 extends downwardly a substantial distance of the throat member 30 and terminates at 33 in a downwardly extending throat chamber 34 which is of considerably larger diameter than the throat passage 32 and may preferably be of substantially the same diameter as the diameter of the upper part of the nozzle 27. This throat chamber 34 extends downwardly for the remainder of the length of the throat member 30 and terminates in the circular opening 35. The throat member 30 has a threaded portion 36 approximately midway of its length whereby it passes through the opening in the absorption tower cap 15 and threadedly engages it. An auxiliary throat member 37 is threaded into the absorption tower cap 15 at 38. This auxiliary throat member 37 is preferably an open-ended metal cylinder having an internal diameter somewhat greater than the external diameter of the depending portion of the throat member 30 so as to form a sort of concentric auxiliary throat chamber 39 around and below the throat chamber 34. A cap member 40 threadedly engages the auxiliary throat member 37 at its lower extremity. The cap member 40 has a downwardly extending centrally located hole 41 passing therethrough. The diameter of this hole 41 is considerably smaller than the diameter of the auxiliary throat member 37 and is in fact of comparable diameter to the diameter of the throat passage 32.

A pair of juxtaposed holes 42 and 43 are bored through the walls of the auxiliary throat member 37 so that the center line of these holes is located upwardly of the length of the auxiliary throat member away from the cap and approximately at the level of the opening 35 in the throat chamber 34. The auxiliary throat member 37 extends downwardly beyond the opening 35 of the throat chamber 34 a substantial distance so that the cap 40 in closing off the end of the auxiliary throat member 37 defines an auxiliary throat chamber 44. The absorption tower cap also has an L-shaped passage 45 passing from the outside thereof and opening downwardly into the top of the absorption tower. A suitable connection nipple 46 may be located in the inside opening of the passage 45 for the purpose of keeping this opening free of dirt and other clogging matter. The passage 45 is connected at its outer end to the nipple 17 which is in turn connected to the by-pass conduit 18. The absorption tower cap thus formed may then be threaded onto the top of the absorption tower 16. The nozzle member 27 is connected, as above described, to a water supply line 11 so that when the valves 12 and 13 respectively are opened water will pass through the water supply line 11 and into the nozzle 27.

It has been discovered in connection with the present invention that the distance between the tip 28 of the nozzle 27 and the V-shaped opening 31 of the throat member 30 is critical. Normally in injectors of this type this distance must be relatively small and must form a restricted gap just below the horizontal center line of the nipple 25 which acts as a sort of side arm. If this is observed the injector will operate when water flows through to pull a vacuum on the side arm or nipple 25 and the auxiliary throat chamber forming members 37 and 40 are not used. If the distance of this throat gap is widened beyond a certain point and its location with respect to the center line of the nipple 25 changed appreciably the injector will cease to function. In the mechanism shown in Figure 3 exactly this is done. The throat gap is widened conciderably beyond the critical point of width at which the normal type of injector ceases to function by raising the tip of the nozzle 27 upwardly from the center of the chamber 26 and lowering the V-shaped opening 31 of the throat member 30 downwardly away from the center of the chamber 26. In other words, the gap is widened beyond a point where it acts, of itself, as a Venturi constriction. In this condition the injector normally will not draw a vacuum through the nipple 25. When, however, the auxiliary throat chamber forming members 37 and 40 are installed around the lower portion of the throat member 30 and below the throat chamber 34 thereof an unusual result is achieved. The water flowing through the injector mechanism will pass outwardly from the opening 35 in the bottom of the throat chamber 34 and fall downwardly into the auxiliary throat chamber 39 against the top of the cap 40 and flow thence outwardly through the hole 41 down into the absorption tower. As long as the flow of water through the injector is slow enough so as to be satisfactorily drained away from the auxiliary throat chamber 39 through the hole 41 no vacuum will be created in the nipple 25. When, however, the flow through the injector is increased so that the water falling into the auxiliary throat chamber 39 is not completely drained off through the hole 41 in the cap 40, obviously the water will tend to fill up the auxiliary throat chamber 39 and overflow through the holes 42 and 43 in the side walls of the auxiliary throat member 37. As the flow of water increases the water will fill up the auxiliary throat chamber 39. As soon as this occurs the injector will immediately begin to draw vacuum through the nipple 25. The sides of the various parts may thus be adjusted with respect to each other so that this starting point of the vacuum will occur at any desired amount of water flow through the injector thereby assuring that a certain predetermined amount of water flow into the absorption tower will be taking place before any gas is drawn into it.

The free space in the absorption tower is connected to the auxiliary supply chamber 7 through the by-pass conduit 18. The effect of this by-pass connection prevents any regurgitation of the absorbing liquid into the gas supply mechanism upon shutting down the injector. Ordinarily without the by-pass line the injector will build up a vacuum in the auxiliary supply chamber 7. The pressure in the absorption tower will normally be near atmospheric pressure. Thus when the valve 12 is shut off so as to shut down the entire absorption system the column of water entrained between the valve 12 and the tip 28 will flow downwardly by gravity into the auxiliary supply chamber, where it meets on one side the atmospheric pressure in the absorption tower exerted upwardly through the passage 32 in the throat member and the vacuum exerted through the nipple 25. Naturally it will be sucked backwardly through the nipple 25 up through the conduit 8 and into the auxiliary supply chamber 7. In the present invention, however, the vacuum which is created in the auxiliary supply chamber is also created in the free space of the absorption tower 16 by reason of the fact that this free space is connected to the auxiliary supply chamber 7 through the by-pass conduit 18. Two very important advantages result from this. First, the excess unabsorbed gas which normally is entrained in the free space of the absorption tower is drawn backwardly again into the supply system through the auxiliary supply chamber 7 and thereby re-injected into the absorption tower with a flow of absorbing liquid. Second, since the pressure in the free space of the absorption tower 16 is the same as that in the auxiliary supply chamber 7 the column of water which flows into the chamber 26, upon shutting down the apparatus, will not be subjected to a pressure differentiation in the chamber 26 and will, therefore, flow downwardly through the throat passage 32 and into the absorption tower rather than be drawn backwardly into the auxiliary supply chamber 7. This equalizing of pressure in the absorption tower and the auxiliary supply chamber 7 cooperates with the critical flow functioning of the injector so that the vacuum built up in the system which tends to draw gas into the absorption tower through the injector will only become operative when the flow of absorbing liquid through the injector mechanism is sufficient to provide for satisfactory and adequate absorption of the gas. This furthermore results in an almost complete absorption of the gas so that practically no gas is left stagnant in the upper portions of the absorption tower.

Frequently it is desirable to provide a spray ring or some other form of spray forming mechanism inside the absorption tower so as to increase the speed of absorption when handling large volumes of gas. This need can be met by modifying the bottom cap portion shown at 40 in Figure 2. One form of such modification is shown in Figure 4 and comprises an elongated cap 50 which is provided with a threaded member 51 for engaging the walls of the auxiliary chamber forming element. This member is also provided with a plurality of very small orifices 52 arranged along its side walls. The total efflux through the whole group of orifices should be so arranged that it is comparable to the efflux from the hole in the bottom of the cap member 40. In such a case it has been found preferable to form the bottom 53 as a solid portion not containing any orifices. However, it is to be understood that orifices may be placed in the area of the bottom also.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

Having thus described the invention what is claimed as new and desired to be secured by Letters Patent is as follows:

1. In a gas absorbing system, the combination of gas supply means, injector means, a conduit directly connecting the gas supply means and the injector, absorption tower means, equalizer means in said conduit and operatively associated both with the gas supply means and the absorption tower means, and capable of equalizing the pressure on both sides of the injector means, said injector means having a side arm providing the connection means between the injector and the conduit, a nozzle and a throat, said throat having a discharge opening, and means extending downwardly and around the discharge opening forming a chamber therearound, said injector being operable with water and being so constructed as to draw a vacuum in the side arm when the water has reached a predetermined level in the chamber, the injector being inoperative to create a vacuum in the side arm when the chamber is incompletely full of liquid.

2. In a gas absorbing system, gas supply means, metering means connected to the gas supply means, conduit means operatively attached at one end to the metering means, injector means operatively attached to the other end of the conduit means, absorption tower means operatively associated with the injector means, equalizer means connected at one of its ends with the top of the absorption tower means and connected at its other end with the conduit means, said injector means having a side arm, a nozzle and a throat, said throat having a discharge opening, and means extending downwardly and around the discharge opening forming a chamber therearound, said injector being so constructed as to draw a vacuum in the side arm when liquid has reached a predetermined level in the chamber, the injector being inoperative to draw a vacuum in said side arm unless the liquid in the chamber has reached said level.

3. In a gas absorbing system, a source of liquid, an injector operated by liquid from said source for creating a suction and directing the gas into admixture with said liquid, a source of absorbable gas, conduit means arranged above the injector and connecting said gas source directly to said injector for feeding the gas to the injector, a by-pass conduit connecting said first named conduit to a point adjacent the outlet of said injector whereby to equalize the gas pressures therein and inhibit regurgitation of the liquid at least one of said conduits providing a chamber therein.

4. In a gas absorbing system, a source of gas, a source of liquid, an injector operated by a flow of liquid from said source for creating a suction and directing the gas into admixture with said liquid, a source of absorbable gas, conduit means arranged above said injector and connecting said gas source to said injector for feeding the gas to the injector, means for maintaining substantially equal gas pressures adjacent the outlet of the injector and in the connecting means whereby to inhibit regurgitation of liquid to the gas supply source, and said injector being operable under the influence of said flow of liquid for creating a suction to draw gas from said source of gas when the flow of liquid reaches a predetermined minimum, the injector means being arranged to be inoperative to draw a vacuum at all rates of flow of the liquid below said predetermined minimum rate.

5. In a gas absorbing system, a source of liquid, an injector operated by liquid from said source for creating a suction and directing the gas into admixture with said liquid, an absorption tower receiving the outflow from the injector, a source of absorbable gas, conduit means connecting said gas source to said injector, metering means in said conduit, an equalizing chamber in said conduit, said equalizing chamber having its gas inlet above the bottom and having a portion thereof elevated above said injector, and means to maintain continuously substantially equal gas pressures in said equalizing chamber and in the absorption tower adjacent the outlet of the injector whereby to inhibit regurgitation of the liquid, said means comprising a conduit connecting the tower and the equalizing chamber.

6. In a device for carrying out the absorption of an absorbable gas in a liquid, a source of absorption liquid under pressure, a vacuum-creating injector fed from said source and discharging into an absorption chamber, a source of absorbable gas, conduit means connecting said source and said injector to feed an absorbable gas to the injector for association with the liquid, metering and control means in said conduit, said injector being actuated by the flow of absorption liquid, said injector being operable under the influence of said flow of liquid for creating a suction to draw gas from said source of gas when the flow of liquid reaches a predetermined minimum, the injector means being arranged to be inoperative to draw a vacuum at all rates of flow of the liquid below said predetermined minimum rate.

7. In a gas absorbing device, an injector system, comprising a source of gas, a vertically extending gas balance chamber, means for supplying gas from said source to said gas balance chamber, liquid operated injector means having an intake side and a discharge side, absorption tower mean having a gaseous zone, conduit means arranged above the injector for conveying gas from the gas balance chamber to the intake side of the injector means, means connecting the gaseous zone of the absorption tower with the discharge side of the injector means, and by-pass conduit means connecting the gaseous zone of the absorption tower with the gas balance chamber, said balance chamber having a portion at least of its interior space elevated above the injector.

8. A gas absorbing system, a combination of supply means for supplying an absorbable gas, absorption tower means, a source of absorption liquid, injector means operable by the flow of said liquid for drawing gas from said gas supply means and introducing the gas into the absorption tower in admixture with said absorption liquid, said injector means being operable to draw gas from said supply means when the rate of flow of said liquid reaches a predetermined minimum, said injector being arranged to be inoperative to draw gas from said gas supply means when the rate of flow of said liquid to the injector is less than said predetermined minimum.

9. In a device for carrying out the absorption of an absorbable gas and a liquid, a source of absorption liquid under pressure, a source of absorbable gas, a vacuum creating injector fed from said source of absorption liquid, conduit means supplying said absorbable gas to the injector, said injector being operated by said absorption liquid to create a vacuum for drawing said absorbable gas from its source, said injector discharging into a mixture receiving chamber, said injector being operable to create said vacuum to draw gas therethrough when the flow of absorption liquid reaches a predetermined value but being arranged to be inoperative to create a vacuum when the flow of said liquid is less than said value.

ROY BLAIR EVERSON.